US010584219B2

(12) United States Patent
Bae et al.

(10) Patent No.: US 10,584,219 B2
(45) Date of Patent: Mar. 10, 2020

(54) COMPOSITE AND METHOD OF PREPARING THE SAME

(71) Applicant: Lotte Advanced Materials Co., Ltd., Yeosu-si (KR)

(72) Inventors: Yun Seok Bae, Uiwang-si (KR); Kyun Ha Ban, Uiwang-si (KR); Kee Hae Kwon, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 62 days.

(21) Appl. No.: 15/854,088

(22) Filed: Dec. 26, 2017

(65) Prior Publication Data

US 2018/0179347 A1 Jun. 28, 2018

(30) Foreign Application Priority Data

Dec. 27, 2016 (KR) ........................ 10-2016-0180116

(51) Int. Cl.

| | |
|---|---|
| ***C08J 5/04*** | (2006.01) |
| ***C08J 11/06*** | (2006.01) |
| ***C08K 7/06*** | (2006.01) |
| ***C08K 3/04*** | (2006.01) |
| ***D01F 11/14*** | (2006.01) |
| ***D01G 11/00*** | (2006.01) |
| ***B29C 48/285*** | (2019.01) |
| ***B29K 105/12*** | (2006.01) |

(52) U.S. Cl.

CPC ............. *C08J 5/042* (2013.01); *B29C 48/297* (2019.02); *C08J 11/06* (2013.01); *C08K 3/04* (2013.01); *C08K 7/06* (2013.01); *D01F 11/14* (2013.01); *D01G 11/00* (2013.01); *B29K 2105/12* (2013.01); *C08J 2300/22* (2013.01); *C08J 2323/00* (2013.01); *C08J 2367/00* (2013.01); *C08J 2377/00* (2013.01); *D10B 2321/02* (2013.01); *D10B 2331/02* (2013.01); *D10B 2331/04* (2013.01)

(58) Field of Classification Search

CPC .... C08J 2300/02; C08J 5/042; C08J 2300/22; C08J 2300/00; B29K 2105/00; B29K 2105/12; C08K 3/04; D01G 11/00; D10B 2321/02; D10B 2331/02; D10B 2331/04; B29C 48/297

USPC ..................... 428/299.1, 294.4, 293.7, 298.1

See application file for complete search history.

(56) References Cited

U.S. PATENT DOCUMENTS

| | | | | |
|---|---|---|---|---|
| 8,747,796 | B2 | 6/2014 | Lee et al. | |
| 10,155,341 | B2 | 12/2018 | Ohki et al. | |
| 2008/0305329 | A1* | 12/2008 | D'Silva | C03C 25/143 428/372 |
| 2013/0192434 | A1 | 8/2013 | Hashimoto et al. | |
| 2014/0120026 | A1* | 5/2014 | Itazu | C08J 11/12 423/447.1 |
| 2014/0245577 | A1* | 9/2014 | Sepati | D01G 11/00 28/100 |
| 2016/0185922 | A1 | 6/2016 | Miura et al. | |
| 2016/0362530 | A1 | 11/2016 | Hannen | |
| 2018/0057970 | A1 | 3/2018 | Ban et al. | |

FOREIGN PATENT DOCUMENTS

| | | | |
|---|---|---|---|
| CN | 106046776 | * | 10/2016 |
| EP | 3098254 | A1 | 11/2016 |
| EP | 3293296 | A1 | 3/2018 |
| JP | 2011-243578 | A | 12/2011 |
| JP | 5973690 | B2 | 8/2016 |
| KR | 10-2013-0139857 | A | 12/2013 |
| KR | 10-2016-0033448 | A | 3/2016 |
| WO | 2012023672 | A1 | 2/2012 |

OTHER PUBLICATIONS

Search Report in counterpart European Application No. 17210244.4 dated May 4, 2018, pp. 1-7.

Office Action in counterpart Korean Application No. 10-2016-0180116 dated Apr. 25, 2019, pp. 1-7.

* cited by examiner

*Primary Examiner* — Camie S Thompson

(74) *Attorney, Agent, or Firm* — Additon, Higgins & Pendleton, P.A.

(57) ABSTRACT

A composite is prepared through extrusion by supplying a thermoplastic resin to a main feeder, followed by supplying a plurality of carbon fiber groups to a side feeder, wherein the carbon fiber groups include a plurality of carbon fiber single yarns having a length of about 6 cm to about 8 cm and unidirectionally aligned.

11 Claims, No Drawings

COMPOSITE AND METHOD OF PREPARING THE SAME

CROSS-REFERENCE TO RELATED APPLICATION

This application claims priority under 35 USC Section 119 to and the benefit of Korean Patent Application 10-2016-0180116, filed on Dec. 27, 2016, the entire disclosure of which is incorporated herein by reference.

FIELD

The present invention relates to a composite and a method of preparing the same.

BACKGROUND

Since carbon fiber reinforced plastic (CFRP) is much lighter than metal and has higher stiffness, carbon fiber reinforced plastic attracts attention as a next generation composite material and is used for weight-reduction of automobiles, aircrafts and the like.

Since a method of processing carbon fiber reinforced plastic is extremely complicated and is mainly automated, a large amount of CFRP scrap, which is waste generated after the manufacture of products, is generated and it is difficult to find a method of discarding or appropriately recycling the CFRP scrap.

In a representative method of recycling CFRP scrap, the CFRP scrap is cut into small pieces, followed by burning the pieces or making the pieces into master batch to be introduced into a compounding product. This method is not widely used due to complicated processes and low efficiency thereof.

In particular, when carbon fibers produced from CFRP scrap are subjected to extrusion, since the carbon fibers are tangled at an entrance of a side feeder into which the carbon fibers are introduced, there is a difficulty in introducing the carbon fibers or performing a process. Although a method of introducing carbon fibers in the form of powder by pulverizing the carbon fibers may be considered to prevent such a tangle of the carbon fibers, there is a problem in that the powder-type carbon fibers are not sufficient to realize stiffness and other mechanical properties as compared with fiber-type carbon fibers.

In addition, there is a problem in that typical composites using CFRP scrap have non-uniform and negative mechanical properties, as compared with composites prepared using carbon fiber materials.

SUMMARY OF THE INVENTION

Embodiments provide an environmentally friendly composite allowing recycling of carbon fiber reinforced plastic (CFRP) scrap and a method of preparing the composite.

Embodiments also provide a composite that can have excellent fluidity without non-uniformity in mechanical properties while maintaining sufficient mechanical stiffness, and a method of preparing the composite.

Embodiments also provide a method of preparing a composite allowing no tangle between carbon fibers.

In exemplary embodiments, the method of preparing the composite includes performing extrusion by supplying a thermoplastic resin to a main feeder, followed by supplying a plurality of carbon fiber groups to a side feeder, wherein the carbon fiber groups include a plurality of carbon fiber single yarns having a length of about 6 cm to about 8 cm and unidirectionally aligned.

The thermoplastic resin may include a crystalline resin.

The thermoplastic resin may include at least one selected from among polyamides, polyesters, and polyolefins.

The carbon fiber single yarns may have an average diameter of about 0.5 mm to about 3.0 mm.

The carbon fiber single yarns may be formed by carding carbon fiber staples (also referred to herein as carbon staple fibers).

The carbon fiber single yarns may be formed by carding and then spinning the carbon staple fibers.

The carbon staple fibers may be obtained by carbonizing carbon fiber reinforced plastic scrap at about 900° C. to about 1,400° C.

The carbon staple fibers may have a tensile modulus of about 100 GPa to about 1,000 GPa, as measured in accordance with ASTM D3379.

The carbon staple fibers may have an average diameter of about 5 μm to about 10 μm and an average length of about 20 mm to about 100 mm.

The composite may include about 5 parts by weight to about 250 parts by weight of the carbon fiber groups based on about 100 parts by weight of the thermoplastic resin.

In exemplary embodiments, the composite may satisfy Equation 1 and Equation 2:

$$250\ \text{MPa} \leq TS \quad \text{[Equation 1]}$$

wherein TS is tensile strength measured on the composite including about 50% by weight (wt %) of a polyamide resin and about 50 wt % of carbon fibers in accordance with ASTM D638; and $$15\ \text{g/10 min} \leq MI \quad \text{[Equation 2]}$$

wherein MI is a melt flow index measured on the composite including about 50 wt % of the polyamide resin and about 50 wt % of the carbon fibers at 265° C. under a load of 2.16 kg in accordance with ASTM D1238.

The present invention provides a composite which allows recycling of carbon fiber reinforced plastic (CFRP) scrap and no tangle between carbon fibers during a preparation process thereof and can have excellent fluidity without non-uniformity in mechanical properties while maintaining sufficient mechanical stiffness, and a method of preparing the same.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A composite according to the present invention is prepared through extrusion by supplying a thermoplastic resin to a main feeder, followed by supplying a plurality of carbon fiber groups to a side feeder.

The thermoplastic resin can include a crystalline resin. Examples of the thermoplastic resin may include without limitation polyamides, polyesters, polyolefins, and the like, and these thermoplastic resins may be used alone or in combination thereof. In addition, the thermoplastic resin may include a crystalline resin and a non-crystalline resin together.

In one embodiment, the non-crystalline resin may be present in an amount of about 40 wt % or less based on the total amount (total weight, 100 wt %) of resin components. In some embodiments, the thermoplastic resin may include the non-crystalline resin in an amount of 0 (the non-crystalline resin is not present), about 0 (the non-crystalline resin is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the non-crystalline resin may be present in an amount of from about any of the foregoing amounts to about any other of the foregoing amounts.

The carbon fiber groups include a plurality of carbon fiber single yarns.

The carbon fiber single yarns may be produced from carbon fiber staples (also referred to herein as carbon staple fibers). Here, the carbon staple fibers are produced from carbon fiber reinforced plastic (CFRP) scrap and the like, which are residues generated during the manufacture of CFRP products. In one embodiment, the carbon staple fibers may be manufactured by carbonizing carbon fiber reinforced plastic scrap at about 900° C. to about 1,400° C., for example, about 1,000° C. to about 1,300° C. In some embodiments, the carbon staple fibers may be manufactured by carbonizing carbon fiber reinforced plastic scrap at about 1,000° C., about 1,050° C., about 1,100° C., about 1,150° C., about 1,200° C., about 1,250° C., or about 1,300° C. Within this range, carbon staple fibers including about 97 wt % or more of carbon can be manufactured.

In one embodiment, the carbon staple fibers may include carbon in an amount of about 97 wt % or more, for example, about 98 wt % to about 99.9 wt %%, as measured by a thermogravimetric analyzer (TGA). In some embodiments, the carbon staple fibers may include carbon in an amount of about 97 wt %, 97.1 wt %, 97.2 wt %, 97.3 wt %, 97.4 wt %, 97.5 wt %, 97.6 wt %, 97.7 wt %, 97.8 wt %, 97.9 wt %, 98.0 wt %, 98.1 wt %, 98.2 wt %, 98.3 wt %, 98.4 wt %, 98.5 wt %, 98.6 wt %, 98.7 wt %, 98.8 wt %, 98.9 wt %, 99 wt %, 99.1 wt %, 99.2 wt %, 99.3 wt %, 99.4 wt % 99.5 wt % 99.6 wt % 99.7 wt %, 99.8 wt %, or 99.9 wt %, as measured by a thermogravimetric analyzer (TGA). Within this range, the carbon staple fibers can secure excellent tensile modulus.

In addition, the carbon staple fibers may have an average diameter (D50) of about 5 μm to about 10 μm, for example, about 6 μm to about 8 μm. In some embodiments, the carbon staple fibers may have an average diameter of about 5 μm, 6 μm, 7 μm, 8 μm, 9 μm, or 10 μm.

The carbon staple fibers may also have an average length (L50) of about 20 mm to about 100 mm, for example, about 30 mm to about 90 mm. In some embodiments, the carbon staple fibers may have an average length of about 20 mm, 21 mm, 22 mm, 23 mm, 24 mm, 25 mm, 26 mm, 27 mm, 28 mm, 29 mm, 30 mm, 31 mm, 32 mm, 33 mm, 34 mm, 35 mm, 36 mm, 37 mm, 38 mm, 39 mm, 40 mm, 41 mm, 42 mm, 43 mm, 44 mm, 45 mm, 46 mm, 47 mm, 48 mm, 49 mm, 50 mm, 51 mm, 52 mm, 53 mm, 54 mm, 55 mm, 56 mm, 57 mm, 58 mm, 59 mm, 60 mm, 61 mm, 62 mm, 63 mm, 64 mm, 65 mm, 66 mm, 67 mm, 68 mm, 69 mm, 70 mm, 71 mm, 72 mm, 73 mm, 74 mm, 75 mm, 76 mm, 77 mm, 78 mm, 79 mm, 80 mm, 81 mm, 82 mm, 83 mm, 84 mm, 85 mm, 86 mm, 87 mm, 88 mm, 89 mm, 90 mm, 91 mm, 92 mm, 93 mm, 94 mm, 95 mm, 96 mm, 97 mm, 98 mm, 99 mm, or 100 mm, as measured by a microscope. Within this range, the carbon staple fibers can have excellent workability and productivity in the process of carding, are not likely to be broken, and can secure mechanical properties.

In one embodiment, the carbon staple fibers may have a tensile modulus of about 100 GPa to about 1,000 GPa, for example, about 110 GPa to about 990 GPa, and as another example about 200 GPa to about 900 GPa. In some embodiments, the carbon staple fibers may have a tensile modulus of about 200 GPa, about 250 GPa, about 300 GPa, about 350 GPa, about 400 GPa, about 450 GPa, about 500 GPa, about 550 GPa, about 600 GPa, about 650 Gpa, about 700 GPa, about 750 GPa, about 800 GPa, about 850 GPa, or about 900 GPa, as measured in accordance with ASTM D3379. Within this range, the single yarns including the carbon staple fibers can have excellent mechanical properties such as tensile modulus and the like.

The carbon fiber single yarns are produced by carding and spinning the carbon staple fibers. In one embodiment, carding is a process of producing a thick sliver by performing parallel arrangement and combing on the carbon staple fibers. Spinning is a process of completing a single yarn by drawing the sliver and then twisting at about 100 twists per meter to about 200 twists per meter (TPM).

In one embodiment, spinning and combing may be optionally further performed after carding. In addition, before carding, pretreatment may be added for minimizing a phenomenon in which the carbon staple fibers are tangled to cling together or are broken.

The carbon fiber single yarns have a length of about 6 cm to about 8 cm. In some embodiments, the carbon fiber single yarns can have a length of about 6 cm, 7 cm, or 8 cm. If the length of the carbon fiber single yarns is greater than about 8 cm, since the carbon fiber single yarns suffer from a tangle between carbon fibers and cling to the side feeder when supplied to the side feeder, the carbon fiber single yarns cannot be subjected to extrusion, and if the length of the carbon fiber single yarns is less than about 6 cm, since the carbon fiber single yarns are broken too short during extrusion, the carbon fiber single yarns cannot realize sufficient mechanical strength required for the present invention.

The carbon fiber single yarns may have an average diameter (D50) of about 0.5 mm to about 3.0 mm. In some embodiments, the carbon fiber single yarns may have an average diameter of about 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, or 3.0 mm. Within this range, it can be easy to supply the carbon fiber single yarns to the side feeder.

The plurality of carbon fiber single yarns, for example, about 10 to about 2,000 carbon fiber single yarns, form a carbon fiber group to be introduced into an extruder. A plurality of carbon fiber groups may be introduced into the extruder. Here, the carbon fiber single yarns constituting the single carbon fiber group are unidirectionally aligned. As such, the unidirectionally aligned carbon fiber single yarns are used, whereby there is no tangle of the carbon fiber single yarns at an entrance of the side feeder, and the composite having excellent mechanical strength and uniform properties can be obtained. The unidirectionally aligned carbon fiber single yarns may be manufactured by carding and spinning the carbon staple fibers, as described above.

The extruder may be a general extruder that includes a main feeder and a side feeder, without being limited thereto.

For example, the composite may be produced at about 220° C. to about 260° C. using a twin-screw extruder having a screw diameter of about 20 mm or more.

In one embodiment, the composite includes the plurality of carbon fiber groups in an amount of about 5 parts by weight to about 250 parts by weight, for example, about 50 parts by weight to about 200 parts by weight, based on about 100 parts by weight of the thermoplastic resin. In some embodiments, the composite can include the plurality of carbon fiber groups in an amount of about 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, or 250 parts by weight. Further, according to some embodiments, the amount of the plurality of carbon fiber groups can be in a range from about any of the foregoing amounts to about any other of the foregoing amounts. Within this range, the composite can exhibit good properties in terms of mechanical strength, fluidity and appearance.

The composite may have a tensile strength equal to or less than about 300 MPa, for example, about 300 to about 250 MPa. In some embodiments, the composite may have a tensile strength of about 290 MPa, about 280 MPa, about 270 MPa, about 260 MPa, or about 250 MPa, as measured on the composite including about 50 wt % of a polyamide resin and about 50 wt % of carbon fibers in accordance with ASTM D638.

The composite may have a melt flow index equal to or less than about 18 g/10 min, for example, about 15 g/10 min to about 18 g/10 min, for example about 18 g/10 min, about 17 g/10 min, about 16 g/10 min, or about 15 g/10 min, as measured on the composite including about 50 wt % of the polyamide resin and about 50 wt % of the carbon fibers in accordance with ASTM D1238.

In one embodiment, the composite may satisfy Equation 1 and Equation 2. In this embodiment, the composite can exhibit good properties in terms of mechanical strength, fluidity and appearance.

$$250\ \text{MPa} \le TS \qquad \text{[Equation 1]}$$

wherein TS is tensile strength measured on the composite including about 50 wt % of the polyamide resin and about 50 wt % of the carbon fibers in accordance with ASTM D638.

$$15\ \text{g/10 min} \le MI \qquad \text{[Equation 2]}$$

wherein MI is a melt flow index measured on the composite including about 50 wt % of the polyamide resin and about 50 wt % of the carbon fibers at 265° C. under a load of 2.16 kg in accordance with ASTM D1238.

Next, the present invention will be described in more detail with reference to the following examples. However, it should be understood that the following examples are provided for illustration only and are not to be construed in any way as limiting the present invention. Descriptions of details apparent to those skilled in the art will be omitted herein.

EXAMPLE

Example 1

Carbon fiber reinforced plastic (CFRP) scrap composed of carbon fibers, which include 50 wt % of carbon and have an average diameter (D50) of 6 μm and an average length (L50) of 90 mm, is carbonized at 1,300° C., thereby preparing carbon staple fibers, which include 98 wt % of carbon and have an average diameter (D50) of 6 μm, an average length (L50) of 90 mm, and a tensile modulus of 250 GPa. Next, the carbon staple fibers are subjected to carding, combing, and spinning, thereby preparing carbon fiber single yarns having a diameter of 0.5 mm and a length of 6 cm.

A carbon fiber group (B1) is formed by unidirectionally aligning 1,000 carbon fiber single yarns prepared as above, followed by introducing 100 parts by weight of the carbon fiber group into a side feeder of a twin-screw extruder having a screw diameter of 40 mm. 100 parts by weight of a polyamide resin (A) is introduced into a main feeder and extrusion is performed at an extrusion temperature of 250° C. Polyamide 6 (PA6) (EN 300, KP Chemtech Co., Ltd.) is used as the polyamide resin (A).

Example 2

A unidirectionally aligned carbon fiber group (B2) is formed from carbon fiber single yarns having a diameter of 3 mm and a length of 8 cm, followed by introducing 100 parts by weight of the carbon fiber group into a side feeder of a twin-screw extruder having a screw diameter of 40 mm. 100 parts by weight of the same polyamide resin (A) as in Example 1 is introduced into a main feeder, and extrusion is performed at an extrusion temperature of 250° C.

Comparative Example 1

A unidirectionally aligned carbon fiber group (B3) is formed from carbon fiber single yarns having a diameter of 3 mm and a length of 9 cm, followed by introducing 100 parts by weight of the carbon fiber group into a side feeder of a twin-screw extruder having a screw diameter of 40 mm. 100 parts by weight of the same polyamide resin (A) as in Example 1 is introduced into a main feeder, and extrusion is performed at an extrusion temperature of 250° C.

Comparative Example 2

A unidirectionally aligned carbon fiber group (B4) is formed from carbon fiber single yarns having a diameter of 3 mm and a length of 5 cm, followed by introducing 100 parts by weight of the carbon fiber group into a side feeder of a twin-screw extruder having a screw diameter of 40 mm. 100 parts by weight of the same polyamide resin (A) as in Example 1 is introduced into a main feeder, and extrusion is performed at an extrusion temperature of 250° C.

Comparative Example 3

Processes are performed in the same manner as in Example 1 except that a carbon fiber group (B5) is supplied to a side feeder. Since the carbon fiber group (B5) is composed of carbon fiber single yarns prepared without unidirectional alignment, the carbon fiber group (B5) has no directionality and is irregular.

Evaluation of Properties (1) Melt flow index (MI, unit: g/10 min)

Melt flow index is measured on pellets prepared by extrusion under conditions 265° C. and a load of 2.16 kg in accordance with ASTM D1238.

(2) Tensile strength (TS, unit: MPa)

Tensile strength is measured on an injection molded specimen, which is obtained using pellets prepared by extrusion, in accordance with ASTM D638.

(3) Extrusion Formability

Extrudability is evaluated in preparation of a composite in pellet form through extrusion.

O: Good extrusion

X: Unable to extrude

TABLE 1

| | | Example 1 | Example 2 | Comparative Example 1 | Comparative Example 2 | Comparative Example 3 |
|---|---|---|---|---|---|---|
| (A) Polyamide resin (parts by weight) | | 100 | 100 | 100 | 100 | 100 |
| (B) Carbon fiber group (parts by weight) | (B1) Unidirectional alignment | 100 | — | — | — | — |
| | (B2) Unidirectional alignment | — | 100 | — | — | — |
| | (B3) Unidirectional alignment | — | — | 100 | — | — |
| | (B4) Unidirectional alignment | — | — | — | 100 | — |
| | (B5) Irregular alignment | — | — | — | — | 100 |
| Melt flow index (g/10 min) | | 18 | 15 | — | 20 | — |
| Tensile strength (MPa) | | 250 | 255 | — | 195 | — |
| Extrusion Formability | | ○ | ○ | X | ○ | X |

As shown in Table 1, the carbon fiber groups of Examples 1 and 2 have excellent melt flow index and tensile strength, and suffer from no tangle between carbon fibers at an entrance of the side feeder. The carbon fiber group of Comparative Example 1 suffers from a tangle between carbon fibers due to large lengths of the carbon fiber single yarns when introduced into the side feeder, is unable to be introduced into the side feeder due to the tangle, and thus, could not be extruded. Despite good extrusion formability, the carbon fiber group of Comparative Example 2 has much lower tensile strength than those of Examples. In addition, it could be seen that the carbon fiber group of Comparative Example 3, which has no directionality and is irregular, could not be introduced into the side feeder due to a tangle between carbon fibers at the entrance of the side feeder when supplied to the side feeder.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A method of preparing a composite, the method comprising performing extrusion by supplying a thermoplastic resin to a main feeder, followed by supplying a plurality of carbon fiber groups to a side feeder, wherein the carbon fiber groups comprise a plurality of carbon fiber single yarns having a length of about 6 cm to about 8 cm and unidirectionally aligned.

2. The method of preparing a composite according to claim 1, wherein the thermoplastic resin comprises a crystalline resin.

3. The method of preparing a composite according to claim 1, wherein the thermoplastic resin comprises at least one of polyamides, polyesters, and polyolefins.

4. The method of preparing a composite according to claim 1, wherein the carbon fiber single yarns have an average diameter of about 0.5 mm to about 3.0 mm.

5. The method of preparing a composite according to claim 1, wherein the carbon fiber single yarns are formed by carding carbon staple fibers.

6. The method of preparing a composite according to claim 5, wherein the carbon fiber single yarns are formed by carding and then spinning the carbon staple fibers.

7. The method of preparing a composite according to claim 5, wherein the carbon staple fibers are obtained by carbonizing carbon fiber reinforced plastic scrap at about 900° C. to about 1,400° C.

8. The method of preparing a composite according to claim 5, wherein the carbon staple fibers have a tensile modulus of about 100 GPa to about 1,000 GPa, as measured in accordance with ASTM D3379.

9. The method of preparing a composite according to claim 5, wherein the carbon staple fibers have an average diameter of about 5 μm to about 10 μm and an average length of about 20 mm to about 100 mm.

10. The method of preparing a composite according to claim 1, wherein the composite comprises about 5 parts by weight to about 250 parts by weight of the carbon fiber groups based on about 100 parts by weight of the thermoplastic resin.

11. A composite prepared by the method according to claim 1, the composite comprising a polyamide resin and carbon fiber groups comprising a plurality of carbon fiber single yarns having a length of about 6 cm to about 8 cm and unidirectionally aligned, wherein the composite satisfies Equation 1 and Equation 2:

$$250\ \text{MPa} \leq TS \quad \text{[Equation 1]}$$

wherein TS is tensile strength measured on the composite comprising about 50 wt % of a polyamide resin and about 50 wt % of carbon fibers in accordance with ASTM D638; and $$15\ \text{g/10 min} \leq MI \quad \text{[Equation 2]}$$

wherein MI is a melt flow index measured on the composite comprising about 50 wt % of the polyamide resin and about 50 wt % of the carbon fibers at 265° C. under a load of 2.16 kg in accordance with ASTM D1238.

* * * * *